United States Patent
Tamura

(10) Patent No.: US 6,977,955 B2
(45) Date of Patent: Dec. 20, 2005

(54) DEMODULATION CIRCUIT FOR CDMA MOBILE COMMUNICATIONS AND DEMODULATION METHOD THEREFOR

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 700 days.

(21) Appl. No.: 10/055,930

(22) Filed: Jan. 28, 2002

(65) Prior Publication Data

US 2002/0101911 A1    Aug. 1, 2002

(30) Foreign Application Priority Data

Jan. 30, 2001    (JP) ............................. 2001-021268

(51) Int. Cl.[7] ............................ H04B 1/69; H04B 7/216
(52) U.S. Cl. ..................................... 375/144; 370/342
(58) Field of Search ................ 375/144, 130, 375/150, 347, 316, 147, 349; 370/342, 335; 455/132, 137, 502, 509, 450

(56) References Cited

U.S. PATENT DOCUMENTS

| | | | |
|---|---|---|---|
| 6,178,193 B1 * | 1/2001 | Kondo | 375/130 |
| 6,498,928 B1 * | 12/2002 | Hiramatsu | 455/278.1 |
| 6,795,422 B2 * | 9/2004 | Ohsuge | 370/342 |
| 2001/0009562 A1 * | 7/2001 | Ohno | 375/148 |
| 2002/0181561 A1 * | 12/2002 | Sano | 375/148 |

FOREIGN PATENT DOCUMENTS

EP    1 148 657 A2    10/2001

* cited by examiner

Primary Examiner—Khai Tran
(74) Attorney, Agent, or Firm—Foley & Lardner LLP

(57) ABSTRACT

A demodulation circuit for CDMA mobile communications systems includes a path comparison portion that detects whether one and the same path has been successively detected or not, and a calculation portion that calculates the timing variation between currently detected path and previously detected path when one and the same path is detected successively. A path timing determination portion assigns a new path to the finger portion in place of a path with a maximum variation if the variation of the path with a maximum variation within the paths already assigned to the finger portion has the variation larger than/equal to a variation threshold when a new path which is not assigned to the finger portion and of which level is higher than/equal to a predetermined assignment threshold is detected.

10 Claims, 4 Drawing Sheets

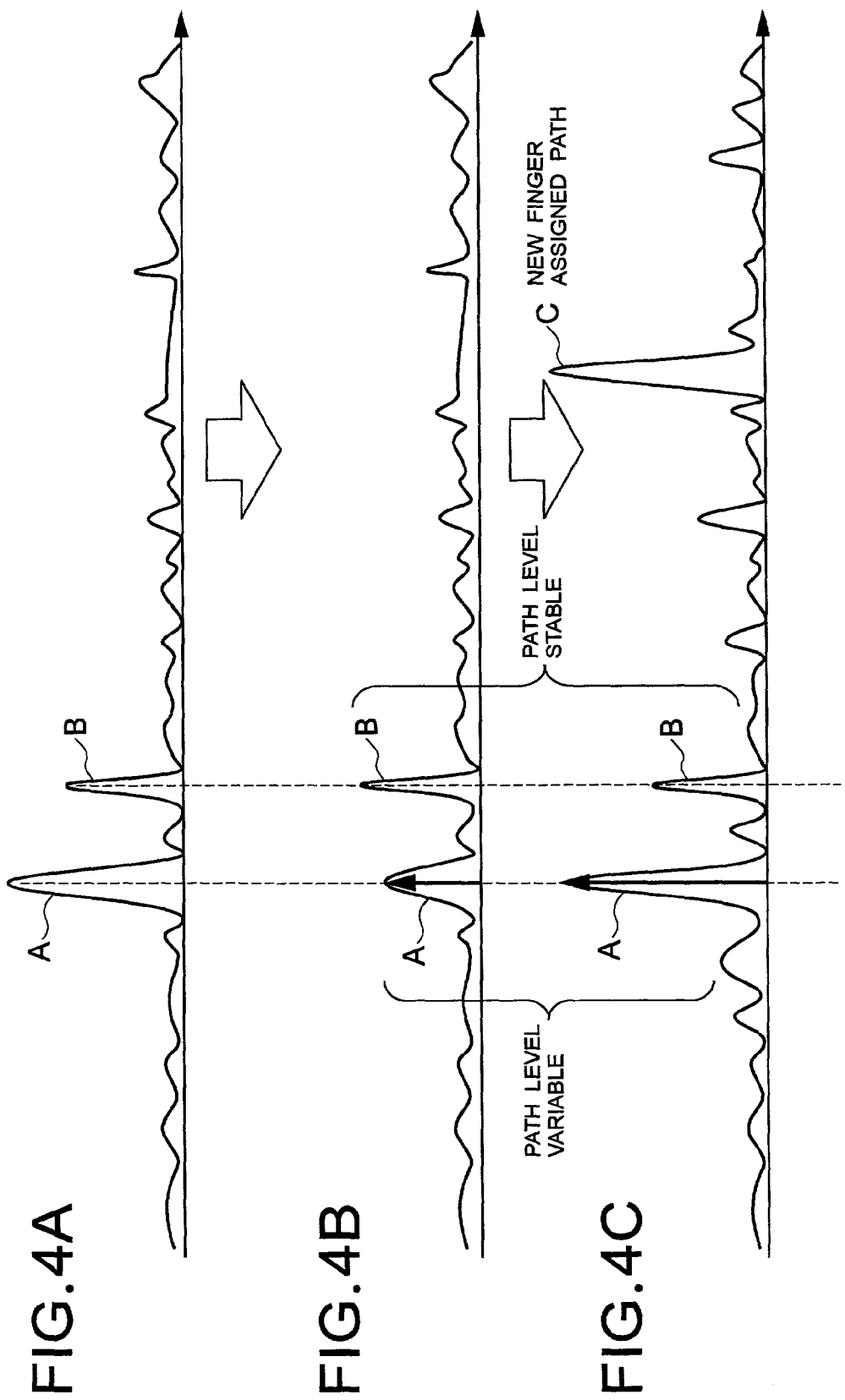

DEMODULATION CIRCUIT FOR CDMA MOBILE COMMUNICATIONS AND DEMODULATION METHOD THEREFOR

BACKGROUND OF THE INVENTION

1. Field of the Invention

The present invention relates to a demodulation circuit for CDMA mobile communications and a demodulation method therefor.

2. Description of the Related Art

Conventionally, the demodulation circuit for this type of mobile communications is provided with a path search portion and a RAKE synthesis/reception portion. The path search portion measures a delay profile, which represents signal power distribution with respect to signal delay time, based on received signals and selects those paths with a high signal power within the measured range to notify the RAKE synthesis/reception portion of the timings of the paths. The RAKE synthesis/reception portion performs de-spreading for each path based on the notified path timings and RAKE-synthesis to exploit path diversity effects.

Radio waves received in such mobile communications environments are subject to signal level variation including path generation and extinction and also subject to the variation in the arrival time of the path to the receiving end due to multipath fading, shadowing and so on. Under such large path variations, the reception qualities will degrade when a sudden level decrease or extinction of paths under search takes place. Therefore, a path search processing to select stable paths out of the arrived paths and assign the stable paths to the fingers is desired.

SUMMARY OF THE INVENTION

Therefore, it is the object of the present invention to prevent the degradation of reception qualities by selecting variation-free, stable paths out of received paths and assigning them.

To solve such problems, the present invention provides a demodulation circuit for CDMA mobile communications, having: a calculation portion for calculating a delay profile, which represents signal power distribution with respect to signal delay time, based on received signals upon receiving I-component and Q-component signals as the output of orthogonal wave detection; and a path search portion for selecting a path with a large signal power from the delay profile calculated by the calculation portion and assigning it to a finger portion, wherein the path search portion comprises: a path comparison portion for determining whether one and the same path has been detected successively or not; a detection portion for detecting the variation between currently detected path and previously detected path when the path comparison portion determines that one and the same path has been detected successively; and a path replacement control portion for assigning a new path to the finger portion in place of a path with a maximum variation, which is detected from paths already assigned to the finger portion, if the variation of the path with a maximum variation is larger than/equal to a predetermined variation threshold, when a new path, which is not assigned to the finger portion and has a power level higher than/equal to a predetermined assignment threshold, is detected.

Moreover, the path replacement control portion is configured to assign a new path to the finger portion in place of a maximum variation path when the level of a path with the minimum reception level among the paths already assigned to the finger portion is greater than/equal to a predetermined assignment exclusion threshold value, and also to assign a new path to the finger portion in place of a path with a minimum reception level when the level of the path with a minimum reception level is less than an assignment exclusion threshold value.

Furthermore, the path replacement portion is configured to exclude said path with a maximum variation or said path with a minimum reception level from the finger portion and to assign a new path to the finger portion when the reception level of a new path is higher than/equal to a replacement level replaceable to the finger portion.

Also, the detection portion is configured to detect at least either one of the variations: timing variation between the timing of currently detected path and the timing of previously detected path; and level variation between the reception level of currently detected path and that of previously detected path.

BRIEF DESCRIPTION OF THE DRAWINGS

FIG. 4 is a time diagram showing the second operation of the above mentioned demodulation circuit.

DESCRIPTION OF THE PREFERRED EMBODIMENT

The present invention will be described below referring to drawings.

The demodulation circuit for CDMA mobile communications according to the present invention allows to receive stable paths thereby achieving enhanced reception qualities by adaptively controlling the finger assigned path position depending on the level variation of the correlation peak values obtained by delay profile calculation in the path search processing.

Figure 1:
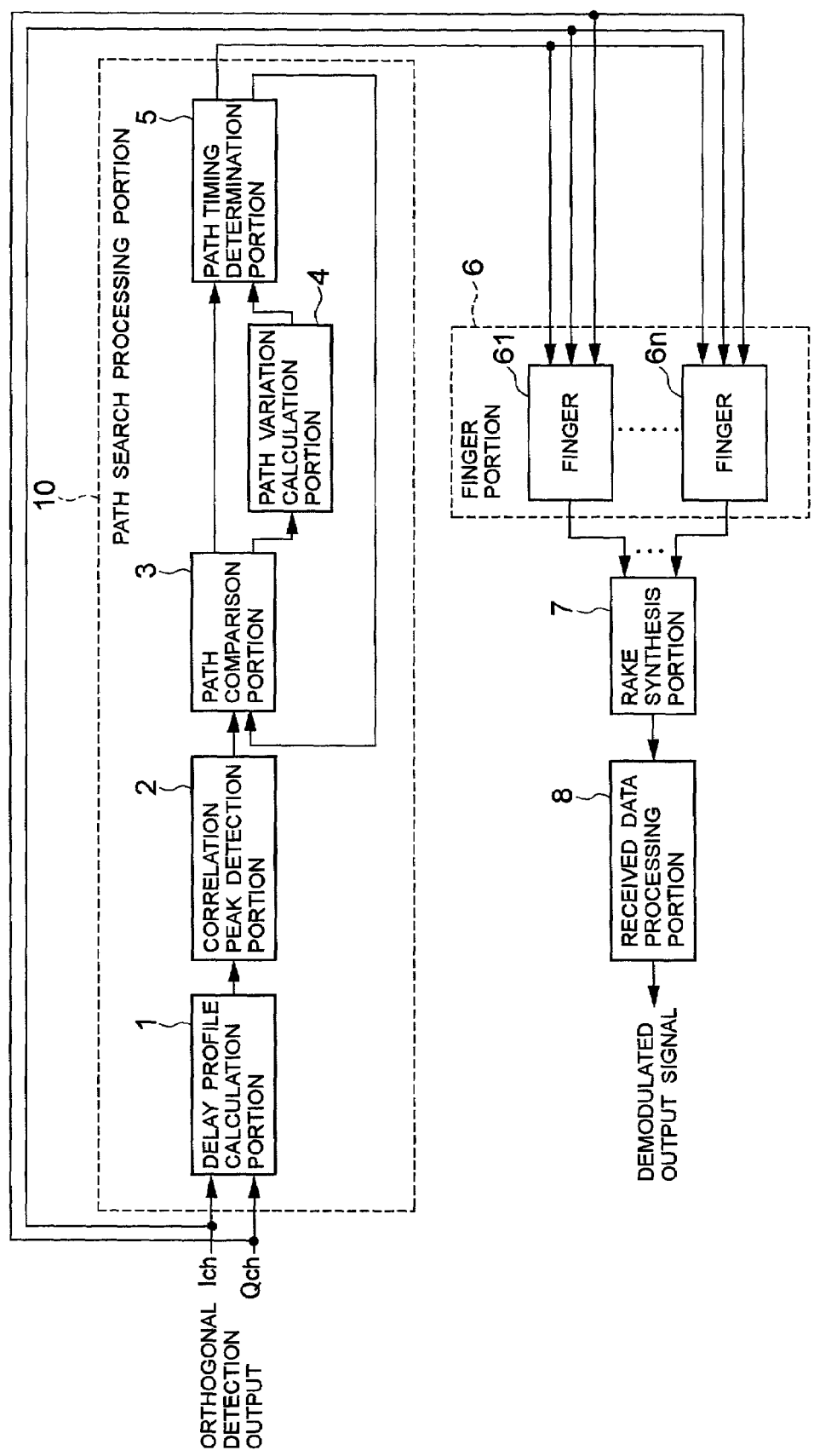
FIG. 1 is a block diagram showing the main configuration of the demodulation circuit for CDMA mobile communications according to the present invention.

FIG. 1 is a block diagram showing the configuration of a demodulation circuit according to a typical demodulation scheme using a finger/RAKE. In FIG. 1, the demodulation circuit is comprised of a path search processing portion 10, a finger portion 6 which consists of a plurality of fingers 61 to 6n, a RAKE synthesis portion 7, and a received data processing portion 8. The path search processing portion 10 is comprised of a delay profile calculation portion 1, correlation peak detection portion 2, a path comparison portion 3, a path variation calculation portion 4, and a path timing determination portion 5.

Next, the outline of the operation of the demodulation circuit shown above will be described.

The I-component and Q-component signals, which underwent orthogonal detection and demodulation, are sent out to the delay profile calculation portion 1 respectively. When each of the I-component and Q-component signals is inputted, the delay profile calculation portion 1 calculates a delay profile, which represents a signal power distribution with respect to signal delay time, based on inputted I-component and Q-component signals and sends out the calculated delay profile to the correlation peak detection portion 2. The delay profile is searched for peaks by the correlation peak detection portion 2, and detected path positions are assigned to fingers of the finger portion 6 as the finger assigned path position preferentially from a path position with a high correlation value by the path timing determination portion 5.

At the finger portion 6, the paths assigned to each finger 61 to 6n are de-spreaded and outputted. The output of the finger portion 6 is RAKE-synthesized by the RAKE reception portion 7, and is outputted to the received data processing portion 8 and is demodulated by the received data processing portion 8. In this case, the path timing determination portion 5 feeds back the path timings assigned to the finger portion 6 and the correlation peak values at that timing to the path comparison portion 3. At the path comparison portion 3, new correlation peak values and peak timings newly detected by the correlation peak detection portion 2 are compared with the feedback information. And for those paths which have been successively detected, the variation in the path timing is calculated at the path variation calculation portion 4. At this point, when there is a change of a finger assigned path due to a change in the propagation path environment, the path timing determination portion 5 is configured to preferentially exclude a path with a larger variation from finger assignment based on the variation calculation results of the path variation calculation portion 4.

Regarding the method for finger assigned path replacement, when replacement of a current finger assigned path with a finger assignment candidate path occurs, the reception levels of the current finger assigned paths are compared with a predetermined assignment exclusion threshold and then if there is a current finger assigned path of which reception level is lower than the assignment exclusion threshold, that path is replaced with a finger assignment candidate path. When replacing a current finger assigned path, of which reception level is higher than/equal to the threshold, with a finger assignment candidate path, current finger assigned path with a large variation is replaced with the finger assignment candidate path based on the path timing variation determined by the path variation calculation portion 4.

Thus, in the present demodulation circuit, the correlation peak values and path timings detected by the correlation peak detection portion 2 are compared with the correlation peak values and path timings previously assigned to the finger portion 6 by the path comparison portion 3 from the delay time profiles calculated by the delay profile calculation portion 1, and from the comparison results, path timing variations of finger assigned paths and finger assignment candidate paths are calculated by the path variation calculation portion 4. And, when there is a change of a finger assigned path due to a change in propagation path environments, the path timing determination module 5 conducts a control to keep such paths with smaller variations as the finger assigned path based on the variation calculation results by the path variation calculation portion 4. Consequently, enhanced reception qualities can be maintained by assigning such paths that are being received stably under the changes in propagation path environments.

Now, the operation of the demodulation circuit shown in FIG. 1 will be explained in more details.

The I-component and Q-component signals which underwent orthogonal detection and demodulation are sent out to the delay profile calculation portion 1 respectively. Upon receiving I and Q demodulated signals, the delay profile calculation portion 1 creates an averaged delay profile (signal power distribution with respect to signal time delay) by calculating the correlation between the I and Q demodulated signals and by further conducting in-phase addition/ power addition. The correlation peak detection portion 2 conducts peak search of the created delay profile, and selects path positions with a high power level as the finger assignment candidate path positions and outputs their timings and correlation values to the path comparison portion 3.

The path timing and its correlation value information, which are assigned to the finger portion 6 at previous timing, are fed back to the path comparison portion 3 from the path timing determination portion 5 and, from the feedback information on correlation values, it is determined whether one and the same path has been detected successively or not. When it is determined that one and the same path has been detected successively at the path comparison portion 3, the path variation calculation portion 4 calculates to what extent the path timing has varied since it was detected last time. The path timing determination portion 5 determines finger assigned path timings based on the correlation value information from the path comparison module 3.

Each finger 61 to 6n in the finger portion 6 conducts de-spreading at the timing of each assigned path, and the RAKE synthesis portion 7 synthesizes the results of de-spreading at each finger 61 to 6n. Then, the received data processing portion 8 extracts desired demodulated output from the signals which have been synthesized by the RAKE synthesis portion 7 exploiting path diversity effects.

When any of the paths assigned to the finger portion 6 by the path timing determination portion 5 is changed due to a change in propagation path environments, the path timing determination portion 5 selects a current finger assigned path of which path level determined at the path comparison portion 3 is lower than the threshold as an assignment exclusion path and replace it with a new assignment candidate path. However, in a case where an assignment exclusion path is selected out of currently finger assigned paths of which path levels are higher than/equal to the threshold, as in the cases where there is no path of which path level is lower than the threshold, or where the number of the assignment exclusion paths of which path levels are lower than the threshold is less than the number of new assignment candidate paths, the path timing determination portion 5 determines assignment exclusion paths utilizing the path timing variations input from the path variation calculation portion 4.

Figure 2:
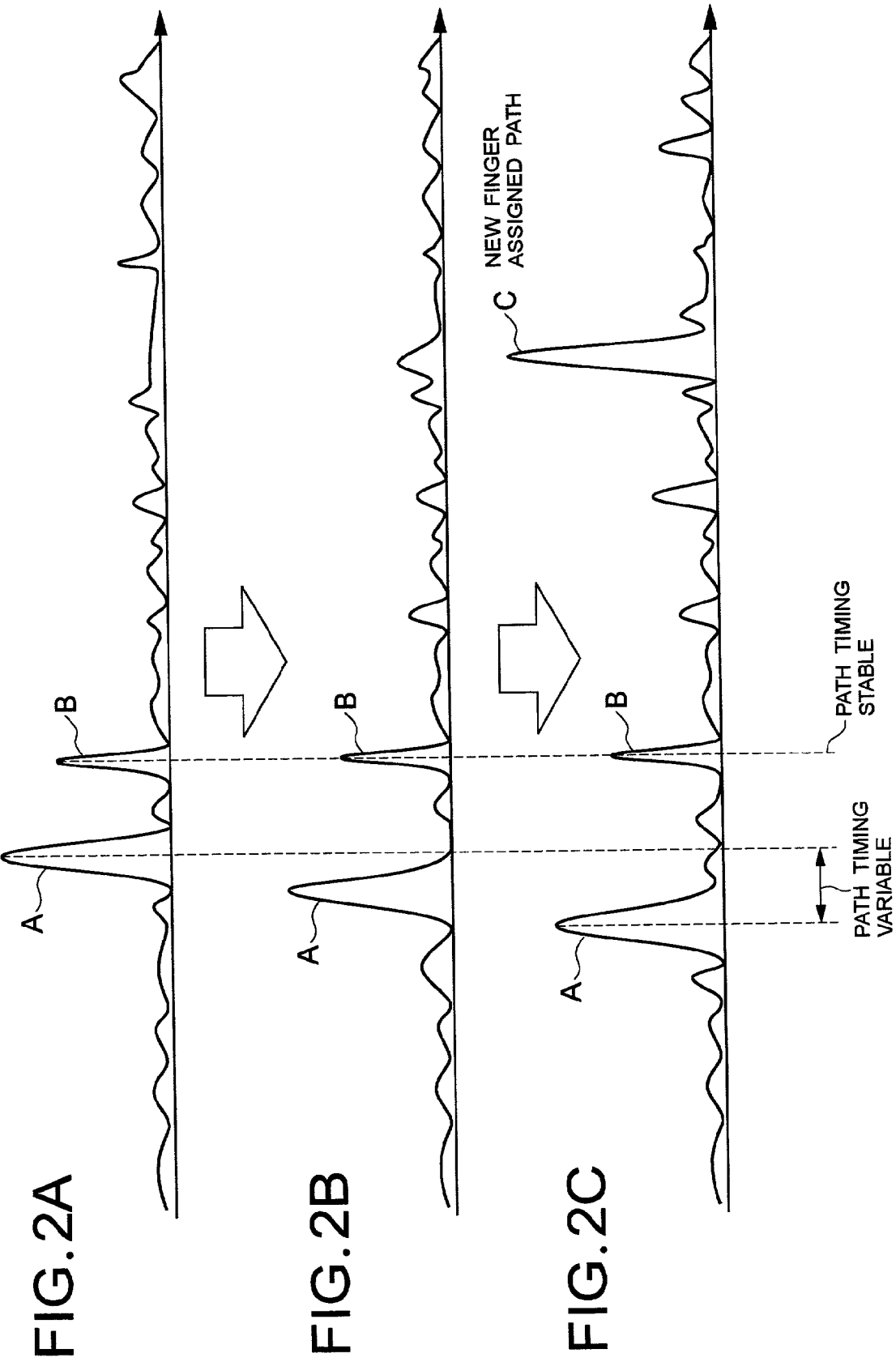
FIG. 2 is a time diagram showing the operation of the above mentioned demodulation circuit.

First Embodiment:

Next, referring to a delay profile shown in FIG. 2A to 2C, the processing of finger assigned path replacement will be described. The paths indicated by A, B in FIG. 2A to 2C show current finger assigned paths and the figures show that the time flows from FIG. 2A to FIG. 2B, then to FIG. 2C. As shown in FIG. 2A to 2C, the path timing of path B is stable against time change, while the detected path timing of path A varies with time and its variation is calculated and recorded in the path variation calculation portion 4 shown in FIG. 1.

Subsequently, a new path C is detected (FIG. 2C) and when the new path C is determined to be a finger assignment candidate path by meeting the requirements: i.e., its path level is higher than/equal to a replacement path level threshold and the number of its detection is larger than/equal to a protective step number (the number of detection to prevent erroneous detection), finger assignment path replacement processing is performed at the path timing determination portion 5. At that time, when the path level of path B is lower than the threshold, path B is excluded from the finger assigned path and path C is assigned as a new finger assignment candidate path. However, when both of the levels of path A and path B are higher than/equal to the threshold, the variations of path A and path B are compared and path A, of which path variation is larger, is excluded from the finger assigned paths.

In this way, stable and enhanced reception qualities are achieved by preserving preferentially such paths with smaller path timing variations, thus such paths with stable reception, instead of preserving preferentially paths with stronger path levels as the finger assigned path when conducting the finger assignment path replacement processing.

Figure 3:
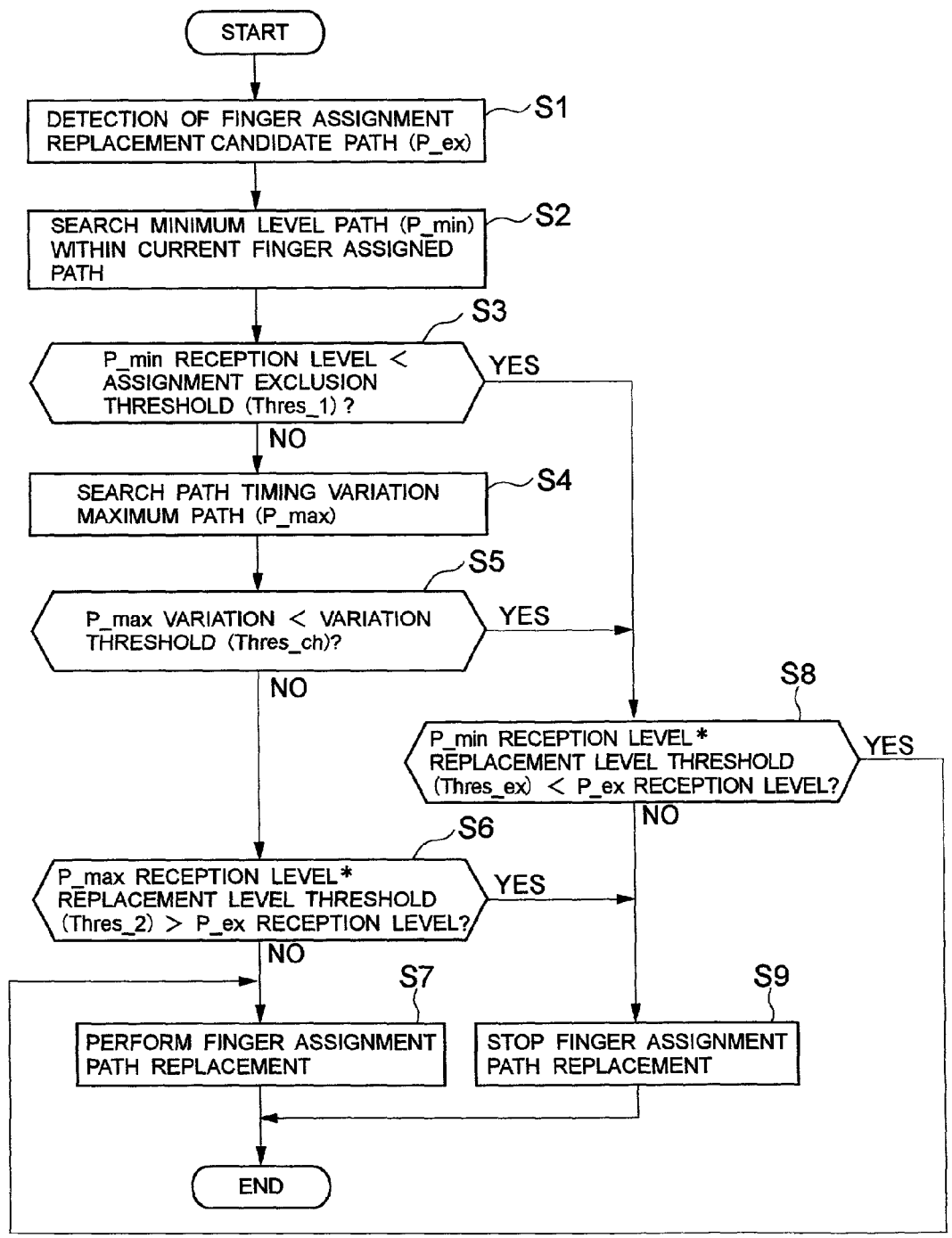
FIG. 3 is a flowchart showing the first operation of the above mentioned demodulation circuit.

Next, the path timing determination processing at the path timing determination portion 5 will be described in more detail referring to the block diagram of FIG. 1 and the flowchart of FIG. 3. When any strong path with a path level higher than/equal to a finger assignment threshold is detected successively more times than the protective step number for preventing erroneous detection at a path timing which is not yet assigned to the finger portion 6, this path is detected as a finger assignment replacement candidate path P_ex (step S1). When a finger assignment replacement candidate path P_ex is detected, a path with a minimum reception level P_min within the current finger assigned paths is searched (step S2) to determine a finger assignment exclusion candidate path.

Then, the reception level of the minimum reception level path P_min is compared with assignment exclusion threshold Thres_1 to determine the difference in magnitude (step S3). At this time, when the reception level of the minimum reception level path P_min is lower than the assignment exclusion threshold Thres_1 and thus the determination of the step S3 is "yes", the reception level of the minimum reception level path P_min is compared with the reception level of the finger assignment replacement candidate path P_ex (step S8). In this case, when the reception level of the finger assignment replacement candidate path P_ex is higher than/equal to the replacement level threshold Thres_ex which indicates a sufficient level for the replacement at the finger portion 6 and thus the determination of step S8 is "yes", the finger assignment replacement candidate path P_ex is set as a new finger assigned path, and the minimum reception level path P_min is excluded from the finger assigned paths (step S7). Furthermore, when the reception level of the finger assignment replacement candidate path P_ex is lower than the above mentioned replacement level threshold Thres_ex and thus the determination at Step S8 is "No", the minimum reception level path P_min is kept as the finger assigned path (step S9) instead of performing the replacement of the assigned path.

When the reception level of the minimum reception level path P_min is higher than/equal to the assignment exclusion threshold Thres_1, and the determination of step S3 is "No", a variation maximum path P_max is searched from the path timing variation for each finger assigned path obtained by the path variation calculation portion 4 (step S4). Then, when the variation of the variation maximum path P_max is smaller than the variation threshold Thres_ch and thus the determination of step S5 is "Yes", the process is moved to the above mentioned processing of step S8. Furthermore, when the variation of the variation maximum path P_max is larger than/equal to variation threshold Thres_ch and thus the determination of step S5 is "No", this variation maximum path P_max is selected as the finger assignment exclusion candidate path and the reception level of the variation maximum path P_max is compared with the reception level of the finger assignment replacement candidate path P_ex (step S6).

When the reception level of the finger assignment replacement candidate path P_ex is higher than/equal to the replacement level threshold Thres_2 which indicates a replaceable level at the finger portion 6 and thus the determination of step S6 is "No", the finger assignment replacement candidate path P_ex is assigned as a new finger assigned path and the variation maximum path P_max is excluded from the finger assigned paths (step S7). On the other hand, when the reception level of the finger assignment replacement candidate path P_ex is lower than the foregoing replacement level threshold Thres_2 and thus the determination of step S6 is "Yes", replacement of assigned paths is not performed and the variation maximum path P_max is preserved as the finger assigned path (step S9).

As described so far, the present embodiment provides, as its first advantage, enhanced reception qualities by preserving stable paths as the finger assigned path. The reason of this is as follows; those paths which have been stably received can be preferentially assigned to the finger through a control of the finger assigned path by monitoring the path variation of each of the finger assigned paths and the finger assignment candidate paths.

As a second advantage, the effects of erroneous path timing detection due to noises are mitigated and enhanced reception qualities are achieved. The reason of this is as follows; by setting a reception level threshold before the finger assignment path replacement processing due to variations, it becomes possible to control path preservation in such a way that those paths with a sufficiently strong and stable reception level are preserved as the finger assigned path.

Second Embodiment:

The finger assignment path replacement processing control according to the second embodiment of the present invention allows to assign stable paths to the finger selecting from the paths arrived at the receiving end, by conducting the path replacement control by means of path level variation, or by a control which uses both path timing and path level simultaneously instead of using path timing variation as used in the first embodiment.

Next, the finger assigned path replacement processing according to the second embodiment of the present embodiment will be described referring to a delay profile shown in FIG. 4A to 4C. The paths indicated by A, B in FIG. 4A to 4C show current finger assigned paths and the figures show that the time flows from FIG. 4A to FIG. 4B, then to FIG. 4C. As shown in FIG. 4A to 4C, the reception level of path B is stable against the change of time, while the detected reception level of path A varies with time and the variation is calculated and recorded in the path variation calculation portion 4 shown in FIG. 1.

When a new path C is detected (FIG. 4C) and the path C is determined to be a finger assignment candidate path by satisfying the requirements of the replacement path level threshold and above described protective step number, the finger assignment replacement processing is performed. At that time, when the path level of path B is lower than the threshold, path B is excluded from the finger assigned paths and path C is set as a finger assignment candidate path. But, when the levels of both path A and path B are higher than/equal to the threshold, the variation in the reception levels of path A and path B are compared and path A, which has a larger variation, is excluded from the finger assigned paths.

In the path search processing, above described protective step number is used to prevent erroneous detection and path assignment. And those paths which have been successively detected more times than the protective step number are assigned to the fingers, and once a path is assigned to the finger, it will not be excluded from the assigned paths unless it is mis-detected successively more times than the protective step number. In this embodiment, it is also possible to control the path replacement processing by using above described protective step number which can be determined at the path comparison portion, not by calculating the variation during the finger assigned path replacement processing at the path variation calculation portion 4 in FIG. 1. In this configuration, the same advantage will still be achieved and therefore the path variation calculation portion 4 can be eliminated.

As described so far, the present invention provides a demodulation circuit for CDMA mobile communications, having: a calculation portion for calculating a delay profile, which represents signal power distribution with respect to signal delay time, based on received signals upon receiving I-component and Q-component signals as the output of orthogonal wave detection; and a path search portion for selecting paths with a large signal power from the delay profile calculated by the calculation portion and assigning them to a finger portion, wherein the path search portion comprises: a path comparison portion for determining whether one and the same path has been detected successively or not; a detection portion for detecting the variation between currently detected path and previously detected path when the path comparison portion determined that one and the same path has been detected successively; and a path replacement control portion, and the path replacement control portion assigns a new path to the finger portion in place of a maximum variation path, which is detected from paths already assigned to the finger portion, if its variation is larger than/equal to a predetermined variation threshold when a new path which is not assigned to the finger portion and has a power level higher than/equal to a predetermined assignment threshold is detected, and thus the present invention allows to selectively assign variation-free, stable paths out of the received paths thereby preventing the degradation of reception qualities.

Furthermore, the path replacement control portion is configured to assign a new path to the finger portion in place of a path with a maximum variation when the level of the path with a minimum reception level within the paths which are already assigned to the finger portion is higher than/equal to a predetermined assignment exclusion threshold, and to assign a new path to the finger portion in place of the path with a minimum reception level when the level of the path with a minimum reception level is lower than the predetermined assignment exclusion threshold, and thereby allows to assign stabler paths.

Also, the detection portion is configured to detect either one of the timing variation between currently detected path timing and previously detected path timing and the level variation between the reception level of currently detected path and the reception level of previously detected path, and thus the detection portion is able to reliably detect the variation of received paths by a simple configuration.

What is claimed is:

1. A demodulation circuit for CDMA mobile communications, including:
   a calculation portion for calculating a delay profile, which indicates a signal power distribution with respect to signal delay time, based on received signals upon receiving I-component and Q-component signals as outputs of orthogonal detection; and
   a path search portion for selecting paths with a large signal power from the delay profile calculated by said calculation portion to assign it to a finger portion, wherein the path search portion comprises:
   a path comparison portion for determining whether one and the same path is detected successively or not;
   a detection portion for detecting the variation between currently detected path and previously detected path when the path comparison portion determined that one and the same path has been detected successively; and
   a path replacement control portion for excluding a path with a maximum variation from the finger portion and assigning a new path to the finger portion if the variation of said path with the maximum variation within the paths already assigned to the finger portion by the detection portion, has the variation larger than/equal to a predetermined variation threshold when said new path, which is not assigned to the finger portion and has a power level higher than/equal to a predetermined assignment threshold, is detected.

2. The demodulation circuit for CDMA mobile communications according to claim 1,
   wherein said path replacement control portion excludes said path with a maximum variation from the finger portion and assign said new path to the finger portion when the level of the path with a minimum reception level within the paths already assigned to the finger portion is higher than/equal to a predetermined assignment exclusion threshold, and excludes said path with a minimum reception level and assign said new path to the finger portion when the level from the finger portion of said path with the minimum reception level is lower than said assignment exclusion threshold.

3. The demodulation circuit for CDMA mobile communications according to claim 2,
   wherein said path replacement control portion excludes said path with the maximum variation or said path with the minimum reception level from the finger portion and assigns said new path to the finger portion when the reception level of said new path is higher than/equal to a replacement level replaceable to the finger portion.

4. The demodulation circuit for CDMA mobile communications according to claim 1,
   wherein said detection portion detects at least either one of the timing variation between the timing of currently detected path and the timing of previously detected path and the level variation between the reception level of currently detected path and the reception level of previously detected path.

5. The demodulation circuit for CDMA mobile communications according to claim 1,
   wherein the path replacement control portion is controlled by using a protective step number which can be determined at said path comparison portion.

6. A demodulation method for CDMA mobile communications for calculating a delay profile, which upon receiving I-component and Q-component signals showing orthogonal detection outputs, indicates signal power distribution with respect to delay time, based on the received signals, and assigning a path with a large signal power to a finger portion by selecting it from the calculated delay profile,
   wherein said method comprises:
   a first step for determining whether one and the same path has been successively detected or not;
   a second step for detecting the variation between currently detected path and previously detected path when it is determined that one and the same path has been detected based on the processing of said first step; and a third step for excluding a path with a maximum variation from the finger portion and assigning a new path to the finger portion when the variation of the path with a maximum variation within the paths already assigned to the finger portion based on the processing of said second step, has the variation larger than/equal to a predetermined variation threshold if a new path which is not assigned to the finger portion and has a level higher than/equal to a predetermined assignment threshold, is detected.

7. The demodulation method according to claim 6,
wherein the processing of said third step comprises a forth step for excluding said path with the maximum variation from the finger portion and assigning said new path to the finger portion when the level of the path with a minimum reception level within the paths already assigned to the finger portion is higher than/equal to a predetermined assignment exclusion threshold, and for excluding said path with the minimum reception level from the finger portion and assigning said new path to the finger portion when the level of said path with the minimum reception level is lower than said assignment exclusion threshold.

8. The demodulation method according to claim 7,
wherein the processing of said third step comprises a fifth step for excluding said path with a maximum variation or said path with the minimum reception level from the finger portion and assigning said new path to the finger portion when the reception level of said new path is higher than/equal to a replacement level replaceable to the finger portion.

9. The demodulation method according to claim 6,
wherein the processing at said second step comprises a sixth step for detecting at least either one of the timing variation between the timing of currently detected path and the timing of previously detected path and the level variation between the reception level of currently detected path and the reception level of previously detected path.

10. The demodulation method according to claim 6,
wherein the finger portion is controlled by using a protective step number which can be determined at said first step.

\* \* \* \* \*